United States Patent
Singh (10) Patent No.: US 7,084,734 B2
(45) Date of Patent: Aug. 1, 2006

(54) SECURE AUTHENTICATION OF A USER TO A SYSTEM AND SECURE OPERATION THEREAFTER

(75) Inventor: Abhishek Singh, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 266 days.

(21) Appl. No.: 10/638,218

(22) Filed: Aug. 7, 2003

(65) Prior Publication Data

US 2005/0030151 A1    Feb. 10, 2005

(51) Int. Cl.
  G05B 19/00   (2006.01)
  G06F 7/00    (2006.01)
  G08B 29/00   (2006.01)
  H04B 1/00    (2006.01)
  H04L 9/11    (2006.01)

(52) U.S. Cl. ................ 340/5.2; 340/5.7; 340/5.8
(58) Field of Classification Search ........... 340/5.2, 340/5.28, 5.3, 5.7, 5.8; 382/115, 116, 187, 382/124; 235/380, 384
See application file for complete search history.

(56) References Cited

U.S. PATENT DOCUMENTS

| | | | |
|---|---|---|---|
| 4,821,118 A | 4/1989 | Lafreniere | 358/108 |
| 5,103,486 A | 4/1992 | Grippi | 382/4 |
| 5,367,295 A | 11/1994 | Gokcebay et al. | 340/825.31 |
| 5,386,104 A | 1/1995 | Sime | 235/379 |
| 5,473,144 A | 12/1995 | Mathurin, Jr. | 235/380 |
| 5,548,660 A | 8/1996 | Lemelson | 382/116 |
| 5,581,630 A | 12/1996 | Bonneau, Jr. | 382/116 |
| 5,629,678 A | 5/1997 | Gargano et al. | 340/573 |
| 5,648,648 A | 7/1997 | Chou et al. | 235/382 |
| 5,686,765 A | 11/1997 | Washington | 307/10.5 |
| 5,719,950 A | 2/1998 | Osten et al. | 382/115 |
| 5,768,383 A | 6/1998 | Sansone et al. | 380/23 |
| 5,793,881 A | 8/1998 | Stiver et al. | 382/115 |
| 5,862,247 A | 1/1999 | Fisun et al. | 382/116 |
| 5,867,802 A * | 2/1999 | Borza | 340/5.53 |
| 5,907,286 A | 5/1999 | Kuma | 340/825.31 |
| 5,920,642 A | 7/1999 | Merjanian | 382/126 |
| 5,987,155 A | 11/1999 | Dunn et al. | 382/116 |
| 6,078,265 A | 6/2000 | Bonder et al. | 340/825.31 |

(Continued)

FOREIGN PATENT DOCUMENTS

JP    401191200 A    8/1989

(Continued)

OTHER PUBLICATIONS

Website Literature, "findBiometrics.com—Multimodal Biometrics Guides and Articles" dated Jun. 11, 2003, 4 pages.

(Continued)

Primary Examiner—Michael Horabik
Assistant Examiner—Nam Nguyen
(74) Attorney, Agent, or Firm—Thomas, Kayden, Horstemeyer & Risley (57) ABSTRACT

Systems, methods, and devices for providing secure authentication of a user to a machine and/or system and secure operation of the machine and/or system thereafter are provided. A representative method, amount others, includes: authenticating a user to a system directly or via a proximity device; authenticating the proximity device to a receiver in the system; upon successful authentication, initiating operation of the system; and intermittently communicating between the proximity device and the receiver to verify whether the proximity device is within continued proximity of the system.

23 Claims, 3 Drawing Sheets

U.S. PATENT DOCUMENTS

| | | | |
|---|---|---|---|
| 6,100,811 A * | 8/2000 | Hsu et al. | 340/5.83 |
| 6,128,398 A | 10/2000 | Kuperstein et al. | 382/118 |
| 6,144,293 A | 11/2000 | Plaschko et al. | 340/426 |
| 6,213,391 B1 | 4/2001 | Lewis | 235/380 |
| 6,225,890 B1 | 5/2001 | Murphy | 340/426 |
| 6,317,544 B1 | 11/2001 | Diehl et al. | 385/115 |
| 6,343,140 B1 | 1/2002 | Brooks | 382/115 |
| 6,430,305 B1 | 8/2002 | Decker | 382/116 |
| 6,445,820 B1 | 9/2002 | Love | 382/187 |
| 6,454,173 B1 * | 9/2002 | Graves | 235/492 |
| 6,483,929 B1 | 11/2002 | Murakami et al. | 382/115 |
| 6,490,443 B1 | 12/2002 | Freeny, Jr. | 455/406 |
| 6,498,970 B1 | 12/2002 | Colmenarez et al. | 701/36 |
| 6,510,236 B1 | 1/2003 | Crane et al. | 382/116 |
| 6,515,575 B1 * | 2/2003 | Kataoka | 340/5.8 |
| 6,539,101 B1 | 3/2003 | Black | 382/124 |
| 6,549,115 B1 | 4/2003 | Daiss et al. | 340/5.31 |
| 6,549,913 B1 | 4/2003 | Murakawa | 707/104.1 |
| 6,565,000 B1 | 5/2003 | Sehr | 235/384 |
| 6,567,775 B1 | 5/2003 | Maali et al. | 704/231 |
| 6,710,700 B1 * | 3/2004 | Tatsukawa et al. | 340/5.53 |
| 2001/0007592 A1 | 7/2001 | Pu et al. | 382/116 |
| 2001/0026632 A1 | 10/2001 | Tamai | 382/116 |
| 2001/0029411 A1 | 10/2001 | Hawthorne | 701/19 |
| 2001/0030644 A1 | 10/2001 | Allport | 345/173 |
| 2001/0045458 A1 | 11/2001 | Polansky | 235/382 |
| 2001/0048025 A1 | 12/2001 | Shinn | 235/382 |
| 2002/0034319 A1 | 3/2002 | Tumey et al. | 382/116 |
| 2002/0056747 A1 | 5/2002 | Matsuyama et al. | 235/382 |
| 2002/0063154 A1 | 5/2002 | Hoyos et al. | 235/382.5 |
| 2003/0011758 A1 | 1/2003 | Ochiai | 356/71 |
| 2003/0031348 A1 | 2/2003 | Kuepper et al. | 382/116 |
| 2003/0033534 A1 | 2/2003 | Rand et al. | 713/185 |
| 2003/0071743 A1 | 4/2003 | Seah et al. | 340/945 |
| 2003/0088780 A1 | 5/2003 | Kuo et al. | |
| 2003/0097596 A1 * | 5/2003 | Muratov et al. | 713/202 |

FOREIGN PATENT DOCUMENTS

| | | |
|---|---|---|
| JP | 402204585 A | 8/1990 |
| JP | 403157084 A | 7/1991 |
| JP | 0200020609 A | 1/2000 |
| JP | 02000251397 A | 9/2000 |
| JP | 02001156921 A | 6/2001 |

OTHER PUBLICATIONS

Conrad Sanderson, Beng (Hons), Abstract presented to The School of Microelectronic Engineering, Aug. 2002 entitled, Automatic Person Verification Using Speech and Face Information, 3 pages.

* cited by examiner

SECURE AUTHENTICATION OF A USER TO A SYSTEM AND SECURE OPERATION THEREAFTER

FIELD OF THE INVENTION

The present invention generally relates to multi-factor authentication to secure machines and/or systems. In particular, the present invention relates to authentication of a user to a machine and/or system via a proximity device and secure operation of the machine and/or system upon successful authentication of the user.

DESCRIPTION OF THE RELATED ART

User authentication is a process by which a system or machine verifies the identity of a user. For user identification, the modes of authentication can be, for example:
 (a) What you know: A user can be authenticated by entering a password and/or personal identification number (PIN) to gain access to various secure systems.
 (b) What you are: A user can be authenticated by providing various biometrics, such as finger prints, deoxyribo nucleic acid (DNA), retinal imagery, etc.
 (c) What you possess: A user can be authenticated by providing a device the user possesses, such as an automatic teller machine (ATM) card, a smart card, a key, etc.

In the case of multi-factor authentication, a user authenticates himself by a combination of any of the above mentioned schemes. One simple example, user authentication to an ATM cash machine, utilizes two-factor authentication. A user provides his/her ATM card and then provides a PIN. Each of these pieces of information is useless without the other. Other authentication factors could be added, such as finger print recognition, that would add another level of security to this example.

In this example, access into the user's checking and/or savings account is provided upon successful authentication. However, this authentication sequence provides only limited access into the banking system's information system. A user providing his or her ATM card and PIN could not get access to information proprietary to the banking institution. Accordingly, this example illustrates an implementation of access control. Another common example of access control is log-in identifications (IDs) to personal computer (PC) workstations. One user ID and password may provide access to a network workstation with limited rights, while another ID, such as an administrator ID and password, has many more rights to the workstation and its accompanying network.

The advance in technology has provided for various new modes of authentication of many new machines and systems. With this advance in technology, however, has come the increased need for more sophisticated authentication algorithms. Furthermore, the current state of the world has added to the demand for secure machines and system. Accordingly, it is ever more desirable to have improved authentication algorithms that can utilize the various new devices available to the user as well as providing for secure operation of the machine and/or system upon successful authentication.

SUMMARY OF THE INVENTION

The present invention utilizes various devices to provide secure authentication of a user to a machine and/or system. Furthermore, secure operation of the machine and/or system, upon successful authentication, is provided for as well. A representative method, among others that are disclosed herein, includes: authenticating a user to the system directly or via a proximity device; authenticating the proximity device to a receiver in the system; upon successful authentication, initiating operation of the machine; and intermittently communicating between the proximity device and the receiver to verify whether the proximity device is within continued proximity of the system.

A representative system, among others that are disclosed herein, includes a receiver coupled to, or integrated with, the system and a proximity device. The proximity device includes means for authenticating a user to the proximity device, means for authenticating the proximity device to the receiver, and means for, upon successful authentication, intermittently communicating between the proximity device and the receiver to verify whether the proximity device is within proximity of the system.

A representative device, among others that are disclosed herein, includes memory for storing identification information of at least a first user, an interface for authenticating a user, an interface for authenticating the device to a receiver integrated with the system, and logic configured to intermittently communicate with the receiver upon successful authentication.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, systems and methods of the invention provide for secure authentication of a user to a system and secure operations of the system thereafter. The embodiments of the present invention utilize multi-factor authentication, more preferably two factor authentication, but not limited to only two.

Figure 1:
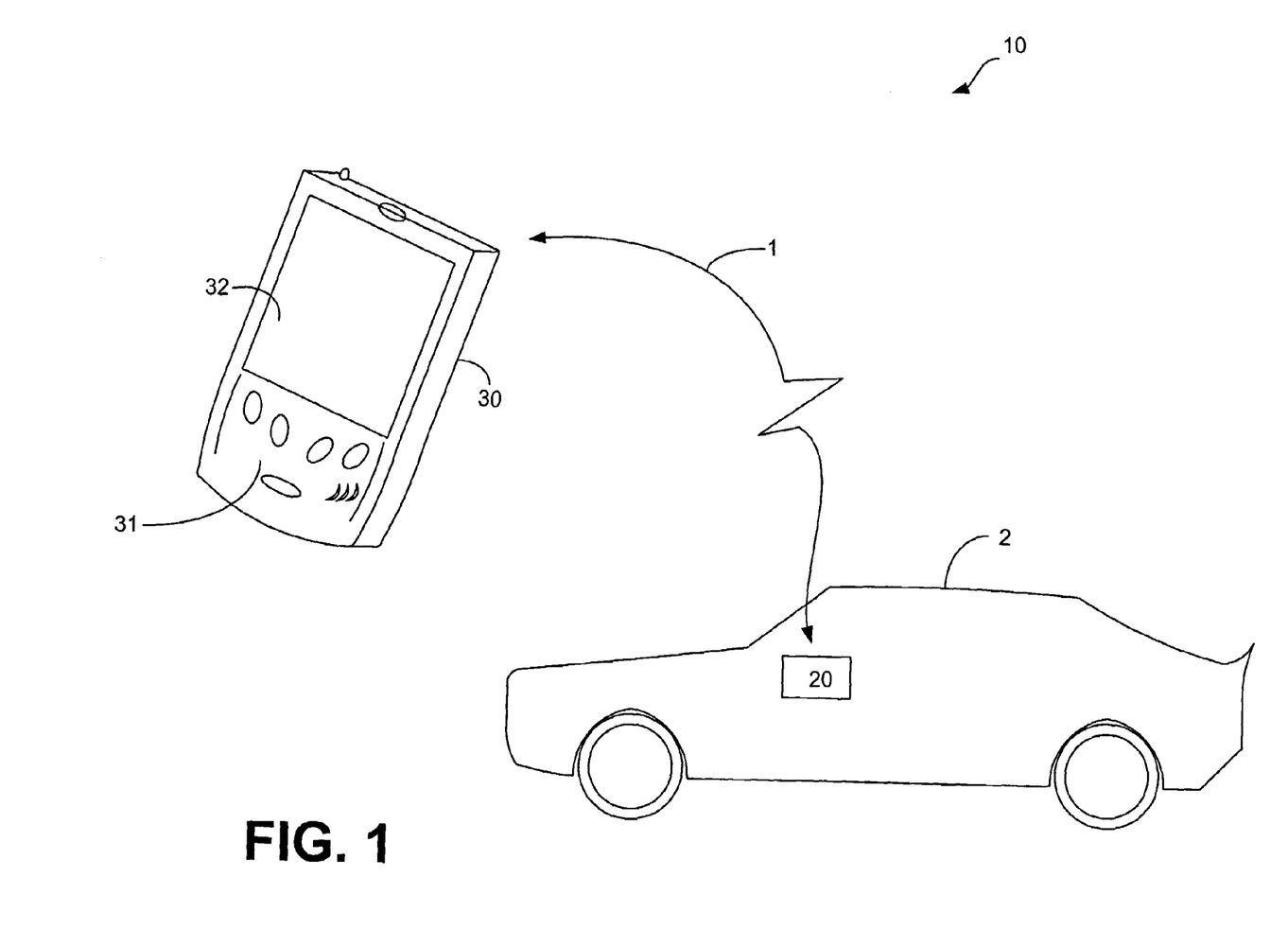
FIG. 1 is a diagram illustrating one embodiment of a system for providing multi-factor authentication of a user to a system via a proximity device, in accordance with the present invention.

Referring now in more detail to the drawings, in which like numerals indicate corresponding parts throughout the several figures. FIG. 1 is a diagram illustrating one embodiment of a system 10 for providing multi-factor authentication of a user to a machine 2 via proximity device 30, in accordance with the present invention. FIG. 1 illustrates a car as the machine 2 communicating with a personal digital assistant (PDA) as the proximity device 30 via communication link 1. In this embodiment the communication link 1 is a wireless communication link. However, a wired communication link could be utilized as well.

The machine 2 could be any machine and/or system requiring secure access and control. Examples of the machine 2 include an automobile, an airplane, a train, heavy machinery, military devices and vehicles, computers, and watercraft. Examples of systems that could utilized the present invention include home-security systems. The machine 2 includes a receiver 20 coupled to the machine 2 or integrated within the machine 2. Preferably the receiver 20 would either be integrated in the dashboard (in the case of an automobile) of the machine 2 or a non-discrete location such as in the trunk. As would be better illustrated in FIG. 2, the receiver 20 includes the means necessary to communicate with the proximity device 30 via communication link 1. The receiver 20 also includes an interface with the machine 2 so as to provide instructions and control for various operations of the machine, such as control to the ignition system.

In this embodiment the proximity device 30 is a PDA. Accordingly, the proximity device 30 includes a user interface 31 which comprises of various buttons and/or switches as is known in the art. The proximity device 30 also includes a display 32. The display 32 in combination with user interface 31 may generally include the means necessary for receiving authentication information from the user by various input methods such as via a touch screen or through the various buttons. Other alternatives for the proximity device 30 include other wireless communication devices such as a cell phone, a pager, a pocket PC, and an audio/video device. The proximity device 30 may also be smart card or a credit card which includes information relevant to the user. The proximity device 30 may also be a camera used to take photographs of the user for verification. The proximity device 30 may also be a portable device, such as those used by parcel delivery couriers. In short, the proximity device 30 may be any portable device capable of storing information pertinent to the user and preferably capable of receiving authentication data from the user.

In the example of a PDA as the proximity device 30 a user may be authenticated to the PDA by entering a PIN, for example, via a touch screen or via manipulating various buttons of the PDA. In the case where a cell phone is the proximity device 30, the user may enter authentication information such as a PIN in a similar manner. This same general method may be used for a pager and pocket PC. Alternatively, the proximity device 30 may include other interfacing devices used to retrieve biometric information, as a non-limiting example, of the user.

In the case where the smart card is the proximity device 30 information pertinent to the user would already be stored on the smart card. In this case, the receiver 20 would include a smart card reader capable of retrieving information from the smart card. Furthermore, in this instance, the receiver 20 would also include a user interface for receiving a second factor of authentication directly from the user. In the case where a camera is the proximity device 30 a photo of the user's face or any other feature unique to the user, such as a retinal image could be taken from the camera and provided to a computing device (which may be a cell phone or PDA) to check for verification.

Having described the general structure of various embodiments of the present invention the general function of this system 10 will be described. The user wishing to operation the machine 2 begins authentication of himself by first authenticating to the proximity device 30. This is accomplished by providing information in a manner as describe above. Upon successful authentication of the user, proximity device 30 begins an authentication sequence with the receiver 20 via communication link 1. In the case where the communication link 1 is wireless, the proximity device 30 must be within proximity of the receiver 20 as defined by the capabilities of the utilized wireless protocol. Alternatively, a wired communication link may be used. In this case the user must connect the proximity device 30 to the receiver 20 either directly via a mechanical connection or via a cable connection. Preferably, the wireless communication link would provide for operation within a proximity of about five to ten feet from the machine 2. Once authentication for the proximity device 30 to the receiver 20 is complete, operation of the machine can then begin. In the preferred embodiment, successful authentication of both the user and proximity device 30 would initiate the ignition system, in this case, of an automobile. However, in the broad sense, successful authentication of the user and the proximity device 30 would provide for a controlled access of machine 2 designated by the users ID information stored in the receiver 20.

Once operation of the machine 2 begins, the proximity device 30 and the receiver 20 periodically communicate with each other to make certain the proximity device 30 remains within proximity of the receiver 20. Furthermore, periodic communication between the proximity device 30 and receiver 20 requires the proximity device 30 to not only be within proximity of the receiver 20 but to be on and operational while in proximity of the receiver 20. In this sense, turning off the proximity device 30 provides for a panic switch in case of an emergency. Accordingly, when the receiver 20 recognizes proximity device 30 either not in proximity or the proximity device 30 not operating, the receiver 20 can initiate a fail-safe mode operation of the machine 2. The fail-safe mode operation may included a distress signal communication to a centralized location monitoring for such a request. In this manner, the local authorities can be notified of the potential problem. Thus, with the simple push of a button, a highjacking of the vehicle can be avoided. The fail-safe mode can also be designed to automatically power down. The machine 2, or alternatively allow operation of the machine 2 in a limited capacity.

In an alternative embodiment a smart card can be used as a proximity device 30. As mentioned, this embodiment may require a complimentary receiver located in the machine 2 that is capable of reading the information from the smart card. Furthermore, the receiver 20 may also include a user interface for receiving a second factor of authentication directly from the user, such as a user PIN, a fingerprint scan, a voice recognition, or other equivalent means. In this manner, the machine 2 would require two factors of authentication supplied by the user in order to operate the machine 2.

Figure 2:
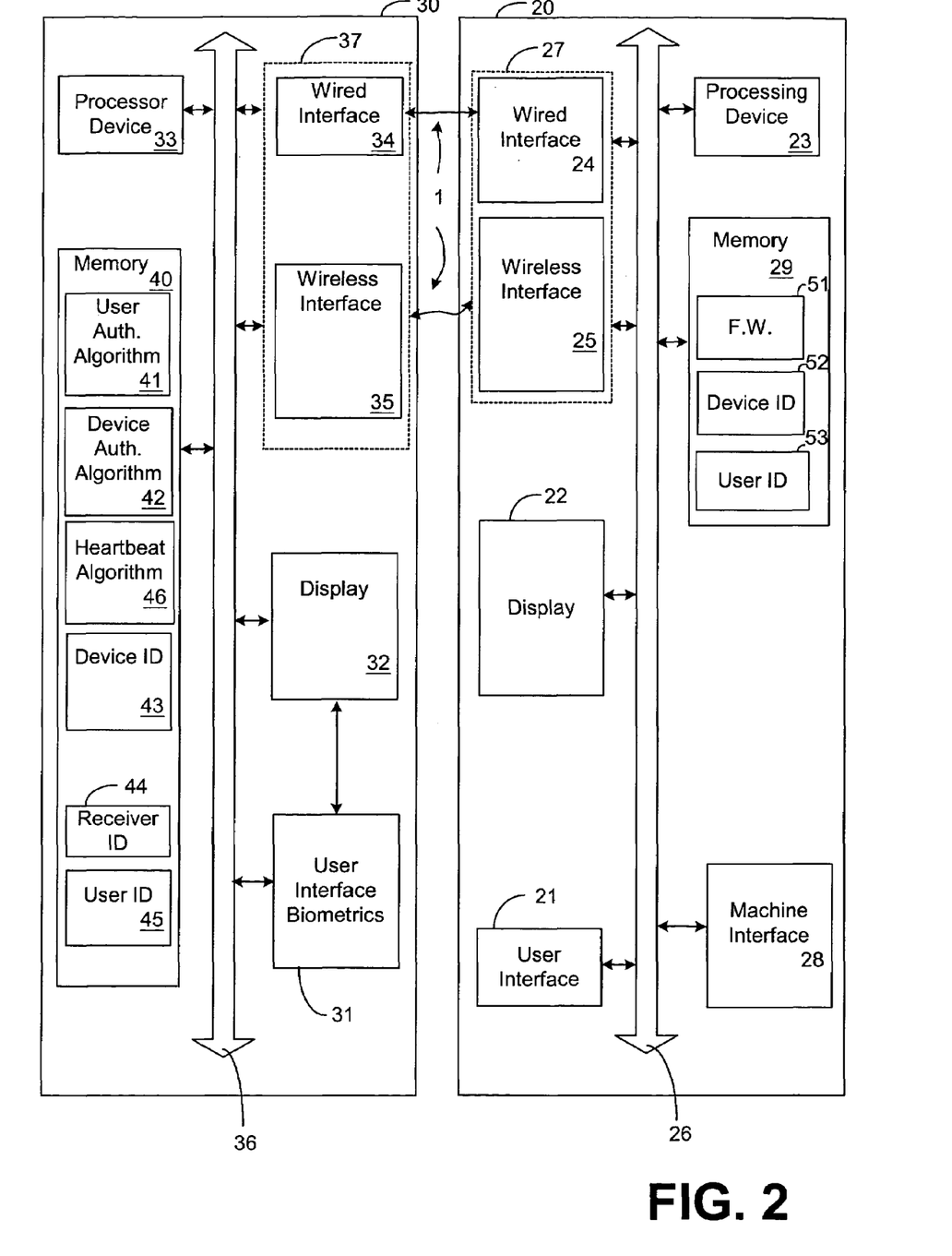
FIG. 2 is a schematic illustrating the system of FIG. 1 in more detail.

Reference is now made to FIG. 2, which is a schematic illustrating the system 10 of FIG. 1 with particular focus on the components of the system 10. As indicated in FIG. 2, the proximity device 30 can comprise a processing device 33, memory 40, one or more user interface devices 31, a display 32, and I/O devices 37, such as a wireless interface device 35 and a wired interface device 34. Each of these components is connected to a local interface 36 that, by way of example, comprises one or more internal buses.

The processing device 33 is adapted to execute commands stored in memory 40 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the proximity device 30.

The one or more user interface devices 31 typically include interface tools with which the device settings can be changed and through which the user can communicate commands to the proximity device 30. By way of example, the user interface devices 31 may comprise one or more function keys and/or buttons with which the operation of the proximity device 30 can be controlled, and a display 32, such as a liquid crystal display (LCD), with which information can be visually communicated to the user and, where the display 32 comprises a touch-sensitive screen, commands can be entered.

In some embodiments, the user interface devices 31 may include various hardware components that are capable of receiving various types of data used to authenticate a user. For example, a finger-print scanner may be incorporated in the user interface devices 31 so as to scan a user's unique finger print. A microphone may be integrated with the user interface devices 31 for receiving samples of the user's voice so as to use voice recognition technology to authenticate the user. In other embodiments, various biometric-capable hardware as is known in the art could be integrated with the user interface device 31 so as to record various biometric measurements of the user, such as finger prints, heartbeat, voice recognition, DNA samples, body temperature. In yet other embodiments, a camera may be integrated with the user interface devices 31 so as to record images of the user. Retinal imagery is another possible method of authentication, as well as facial imagery. Various other devices capable of receiving authentication information, including password and PIN type information, may be integrated with the user interface devices 31. As will be seen, the necessary firmware and drivers associated with such hardware may be located in the memory 40 of the proximity device 30. The method of authentication between the proximity device 30 and a user can also be the combination of any of the above mentioned procedures. For example it can be a combination of PIN and voice, PIN along with finger-prints, etc.

With further reference to FIG. 2, the one or more I/O devices 37 are adapted to facilitate connection of the proximity device 30 to another device, such as the receiver 20, and may therefore include one or more serial, parallel, small computer system interface (SCSI), universal serial bus (USB), infrared, 802.11, IEEE 1394 (e.g., Firewire™), and/or personal area network (PAN) components. In general, the I/O devices 37 include the necessary hardware in the proximity device 30 to communicate with another device, preferably in a proximity-defined protocol.

The memory 40 includes various software (e.g., firmware) programs including the firmware to facilitate operation of the various user interface devices 31 discussed above, the various I/O devices 37 discussed above, as well as other algorithms. The memory 40 includes the software for the user authentication algorithm 41, the device authentication algorithm 48, and the "heartbeat" algorithm 46. Also stored in memory 40 is identification (ID) information 45 of the user, ID information 43 of the proximity device 30, and possibly ID information 44 of the receiver 20. The various software programs may be operated on the devices located in the proximity device 30 by the processing device 33.

Similarly, the receiver 20 of the machine 2 may include a processing device 23, memory 29, I/O devices 27, display 28, user interface devices 21, and machine interface 22 all interconnected via local interface 26. The processing device 23 functions similarly to the processing device 33 of the proximity device 30. Likewise, the local interface 26 functions similarly to the local interface 36. The I/O devices 22 may include a wireless interface 24 and/or a wired interface 25. Specific wireless or wired protocols are discussed with reference to the I/O devices 36 of the proximity device 30.

The display 22 and user interface devices 21 may be much like the display 32 and user interface devices 31 of the proximity device 30. In some embodiments, a user may authenticate himself or herself directly to the receiver 20. Accordingly, an interface is necessary to receive such authentication information. In these embodiments, the user interface devices 21 may also include a smart card reader, or similar technology, so as to provide for a second factor of authentication. Accordingly, a user can place a smart card into the smart card reader and provide a PIN, via a keypad, much like an ATM machine. In other embodiments, a display 22 and user interface 21 may be excluded from the receiver 20. In these embodiments, the user would be authenticated via the proximity device 30.

The machine interface 28 provides for access into various systems of the machine 2. For example, the machine interface 28 may provide for the interface into the ignition system of an automobile. Another example may be access into the computer system of the machine 2. The machine interface 28 may be fully integrated with the machine's operating system, so as to provide access control to various operational modes and aspects of the machine 2.

The memory 29 of the receiver 20 may include the firmware 51 for various authentication algorithms, including authentication of the user directly and authentication of the proximity device 30. The firmware 51 may also include the reciprocal "heartbeat" algorithm to be discussed shortly. The memory 29 may also include user ID information 53, proximity device ID information 52, as well its own ID information 54. User ID information 53 and the proximity device ID information 52 may or may not be in the receiver as per the requirement to operate a machine. For example, in the case of UPS or FedEx, there can be many drivers to drive an automobile. So, for this case it may not be desirable to store the identity of a user and the identity of a device in the receiver.

Attention is now directed towards the various algorithms stored in memory 40 and/or 29 and performed by the devices. The user authentication algorithm 41 is performed when a user attempts to authenticate himself or herself to the proximity device 30. The user authentication algorithm 41 may be configured to function with the specific authentication-receiving hardware located in the user interface devices 31. The user authentication algorithm 41 may then query the user ID information 45 to verify whether the information retrieved by the user is valid. If so, the user may then be authenticated to the proximity device 30. If not, a failure routine may be initiated which may include re-attempting to receive the user information by the user interface devices 31. After a predetermined number of failures, the user ID information 45 and/or device authentication algorithm 42 may be garbled in such a manner that external information and operation may be necessary. In this manner, theft of the proximity device 30 and attempts at authenticating to the stolen proximity device 30 may be thwarted.

The device authentication algorithm 48 is performed once the user has been authenticated to the proximity device 30. The device authentication algorithm 48 authenticates the proximity device 30 to the receiver 20 and may also be used to carry user ID information so that the receiver 20 may also authenticate the user. There are a wide variety of device authentication algorithms 48 that are known in the art and more and more are developed as time goes by. Some examples of device authentication algorithms 48 include: a challenge-response algorithm, a digital signature algorithm, a public-private key algorithm, a one-time password algorithm, and a symmetric-key algorithm. Any combination of the above could also be utilized. The identity of the user can also be used in the device authentication algorithm.

Challenge response is a common authentication technique whereby some private information is verified by a response presented for a given challenge. Receiver 20 contains the challenge algorithm in memory 29. Proximity device 30 contains the response algorithm in its memory 42. Either proximity device 30 will send a signal to initiate the challenge response authentication or the signal can be initiated by some sort of switch attached to the machine 2. Receiver 20 sends the challenge to the proximity device 30. Proximity device 30 computes the response, as per the response algorithm stored in memory 42. Proximity device 30 then sends this response or a derivation thereof to the receiver 20. Upon successful verification of the response by the receiver 20, proximity device 30 is authenticated. Receiver 20 then sends a signal to the machine via the machine interface 28, to operate in a normal mode.

Digital signature algorithm is a public-key algorithm; the secret key operates on the message a hash generated by a hash algorithm, like SHA-1 or MD5. To verify a signature, the hash of the message is recomputed, the public key is used to decrypt the signature, and the results are compared. One example of the public-key algorithm is RSA, named after its three inventors. Proximity device 30, contains the private keys, the signature algorithm, and the hash algorithm in memory 42. Proximity device 30 and the receiver 20 both have the same hash algorithm and the signature algorithm. Receiver 30 in addition to the hash algorithm, and the algorithm to verify the signature, also contains the public keys. Proximity device 30 generates a message, calculates its hash, signs it with its private keys, and sends the message along with the signature to the receiver 20. Receiver 20 uses its public key to decrypt the signed hash and calculates the hash of the message. If the decrypted hash matches the hash of the message, machine interface 28 sends a signal to the machine to operate.

Public private key algorithm, such as RSA, can also be used for the authentication between the receiver 20 and the proximity device 30. Proximity device 30 contains the public keys in the device authentication algorithm 42. Receiver 20 contains private keys in its memory 29. Proximity device 30 encrypts a predetermined message along with some nonce like a timestamp, and sends the encrypted message to the receiver 20. Receiver 20 decrypts the message using its private keys and compares it with the stored message. In the case of a successful match, machine interface 28 sends a signal for the normal operation of the machine. Proximity device 30 and the receiver 20 may also store the algorithm to calculate the nonce. Some of the example of the nonce can be time or some random number.

One time password, such as S/Key, could be the other mode of authentication between the proximity device 30 and the receiver 20. One time password algorithm can either be an event synchronous algorithm or a time synchronous algorithm. For an event synchronous algorithm proximity device 30 and the receiver 20 use a simple counter as the input value. The initial value of the counter along with the password algorithm is stored in the proximity device's 30 memory 40 and in the receiver's memory 29. Each time an event occurs, when the proximity device 30 tries to authenticate to the receiver, the counter is incremented and the incremented value is used as the input value for the password algorithm stored in the device authentication algorithm 42. The input value is then encrypted and the result becomes the one-time dynamic password. Likewise, the receiver 20 also has a counter. Receiver 20 decrypts the password and compares the value with the counter. In the case of a successful match, machine interface 28 sends a signal to the machine 2 for the normal operation and the counter stored in the memory 29 is incremented.

In the case of a time synchronous algorithm, receiver 20 and the proximity device 30 have a synchronized clock along with the encryption algorithm. Current value of the clock along with the message acts as an input to the encryption algorithm stored in the device authentication algorithm 42. Proximity device 30, computes the one time password based upon the input. This one-time password is sent to the receiver 20. Receiver 20, uses the current value of the clock along with the message, and encrypts it with the encryption algorithm to generate the one-time password. If the one-time password computed by the receiver matches with the password sent by the proximity device, a signal is sent to the machine interface 28 for normal operation.

Symmetric-key algorithms, like AES and DES, can also be used for authentication between the proximity device 30 and the receiver 20. In this scenario, proximity device 30 and the receiver 20 share the symmetric secret keys along with the encryption algorithm in their respective memory. Both devices 20, 30 also share some predetermined message, and an algorithm to compute the nonce. Proximity device 30 encrypts the predetermined message and the nonce with its secret keys. The proximity device 30 sends this encrypted message to the receiver 20. Receiver 20, decrypts the message checks the nonce and the message. In the case of a successful match, the receiver 20 sends a signal via machine interface 28 for the normal mode of operation.

All the above mentioned algorithms describe the mode of authentication between the proximity device 30 and the receiver 20. Variations of the above mentioned algorithms are also possible. One variation of the above mentioned algorithms can be the adding of a user ID along with the encrypted message. Another variation can be making use of any combinations of the above mentioned algorithms. For example in the case of a one-time password, along with the one-time password identity of a user can also be sent.

In some embodiments, the proximity device 30 may be a smart card that may include a memory element for storing ID information. In this case, a reader integrated in the receiver 20 may be configured to read ID information stored on the smart card. The receiver 20 may then correlate ID information input directly from the user with ID information retrieved from the smart card. Furthermore, the smart card would store its own ID information that would be provided to the receiver 20, thus completing two factors of authentication.

The "heartbeat" algorithm 46 provides for secure operation of the machine 2 after the initial authentication step. During operation of the machine 2, periodic secure communications may be performed between the proximity device 30 and the receiver 20. The receiver 20 will recognize when the proximity device 30 is not responding, thus implying the proximity device 30 is either not operating, or is out-of-range. The receiver 20 may be configured to trigger a fail-safe mode of operation of the machine 2 if the proximity device 30 does not respond. Accordingly, the heartbeat algorithm 46 functions as a panic button to the user, in the event of an impending problem. A simple push of a button may turn off a cellular phone (serving as the proximity device 30) in the event of a problem. Eventually, the receiver 20 will recognize that there is a problem and respond in a number of ways. Another useful example can be illustrated by delivery truck drivers, such as UPS or FedEx drivers. Delivery truck drivers make frequent deliveries that require them to leave the immediate premises of their trucks. A proximity device 30 located on the driver, perhaps an electronic signature tablet they currently utilize, may be utilized to secure the momentarily abandoned vehicle. If a person attempted to steal the vehicle while the driver was out making a delivery, the person could only go so far before the receiver 20 realized that the proximity device 30 was not responding, thus triggering a fail-safe mode. The proximity device 30 may be configured with a sleep mode that essentially turns off operation of the device 30, but still can intermittently communicate with the receiver 20.

The fail-safe mode may involve shutting down power to the machine 2 and/or sending a distress signal to a centralized monitoring location. The fail-safe mode could involve a wide-variety of operations created and designed to provide security and/or notification of a potential safety problem.

The user ID information 45 may include ID information of various users. In this manner, various users could utilize the same proximity device 30. This may be particularly beneficial in military type environments, where several different users have access to a machine. Families may benefit from this in that one PDA or cell phone may be used to authenticate any member of the family, similar to a single set of car keys. The receiver 20 may be provided with access control information that limits certain control rights to a particular user. The user ID information 45 may be uploaded to the proximity device 30 (and/or the receiver 20) by the user via a secure interface.

The device ID information 43 holds a unique identification of the proximity device 30. This information 43 may be populated in the proximity device 30 by the original manufacturer. The receiver 20 can then be "trained" to recognize each proximity device 30 the user wishes to enable. The "training" session can be performed via a secure interface. Alternatively, each proximity device 30 may have its device ID information 43 dictated by the receiver(s) 20 the user wishes to allow authentication ability. In this manner, the user may also be able to change the device ID information 43 by means of a secure interface. This would make replacing a proximity device 30 fairly painless.

The proximity device 30 may also include receiver ID information 44 used to identify at least one receiver 20 in which the proximity device 30 could authenticate to. Likewise, the receiver 20 will also store its own receiver ID information 44.

The exact information stored can vary with a particular application. In the broadest sense, this invention provides for an extra factor of authentication that can also provide for great flexibility in its use.

Various software and/or firmware programs to perform authentication (i.e. user authentication algorithm 41 and device authentication algorithm 42) have been described herein as well as software and/or firmware required to maintain a "heartbeat" (i.e. heartbeat algorithm 46) between the proximity device 30 and the receiver 20. It will be appreciated that the various software and/or firmware programs can be embodied in any computer-readable medium for use by or in connection with an instruction execution system, apparatus, or transmission device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the information system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the discussion that follows, flow charts are provided. It is to be understood that any process steps or blocks in these flow charts represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 3:
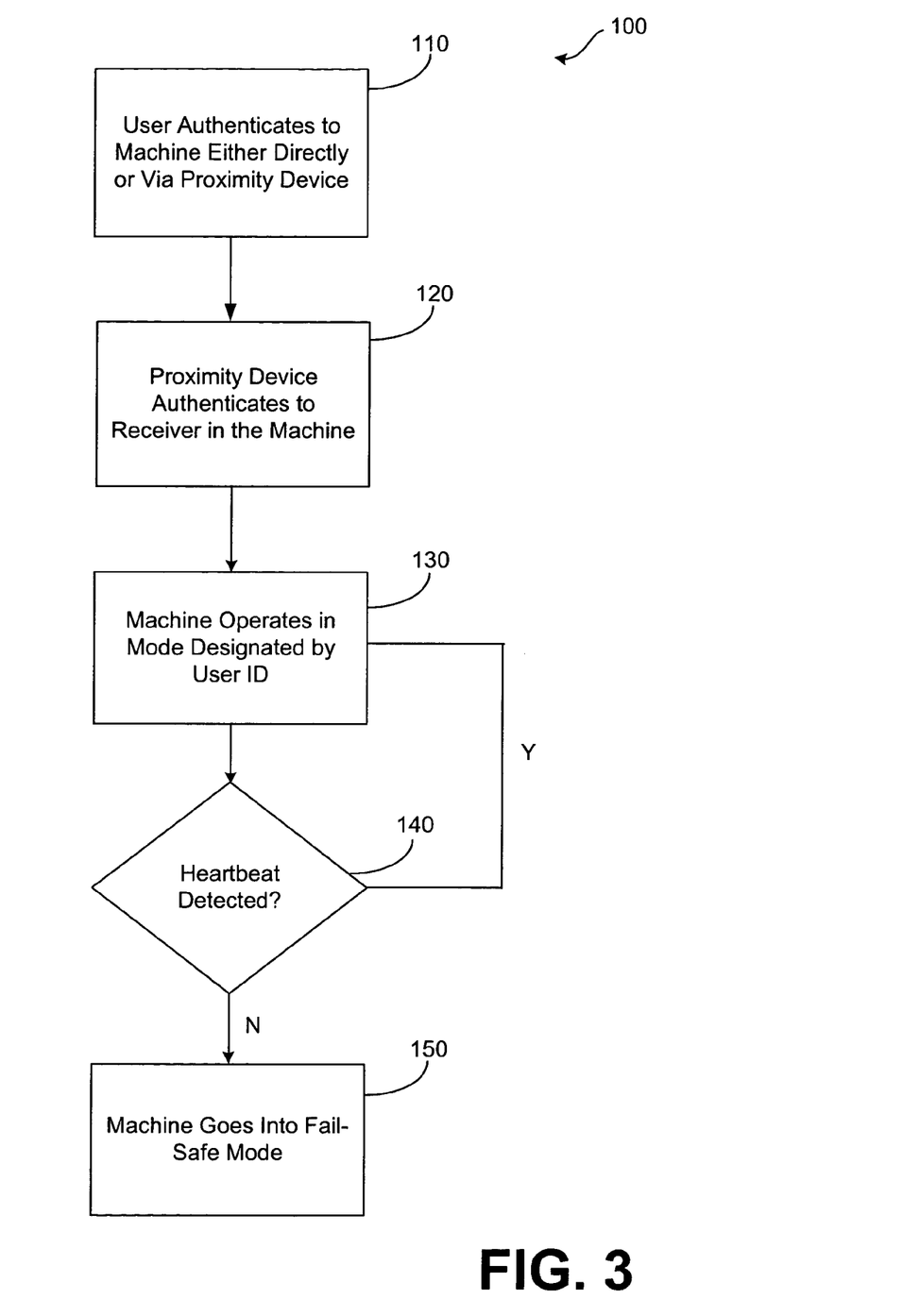
FIG. 3 is a flowchart illustrating a method of authenticating a user to a system, and secure operation of the system, thereafter, in accordance with embodiments of the present invention.

FIG. 3 is a flowchart illustrating a method 100 of authenticating a user to a machine 2, and secure operation of the machine 2, thereafter, in accordance with embodiments of the present invention. The method 100 begins upon a user wishing to use the machine 2. The user first authenticates himself either to the machine 2 directly (via a receiver 20 with appropriate user interface) or to a proximity device 30 (step 110). As described above, there are various methods in which a user may authenticate himself. An algorithm for providing a limited number of opportunities to be authenticated could be integrated into the method.

Once the user is authenticated, the proximity device 30 may be authenticated to the receiver 20 of the machine 2. As described above, a number of methods could be utilized to authenticate the proximity device 30 to the receiver 20 (step 120).

Upon successful authentication, the machine may begin operation in a mode designated by the access control incorporated in the receiver 20 (step 130). For example, successful authentication may be configured to start an automobile or provide for initialization of a missile launch. The user may have limited rights in operating the machine 2. For example, the user may only be able to operate a vehicle below a maximum set speed.

During operation, the receiver 20 intermittently communicates with the proximity device 30 to assure the proximity device 30 remains operational and within proximity (step 140). In the event, a "heartbeat" is not detected over a given interval, the machine 2 can enter into a fail-safe mode, which may include a number of operations that provide for safety and notification of the situation.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. For example, it will be appreciated by those skilled in the art that the particular format of the information and medium on which it is communicated could be chosen from any means capable of doing so. All such modifications and variations are intended to be included herein within the scope of the present invention and protected by the following claims.

The invention claimed is:

1. A method for providing secure authentication of a user to a system and secure operation of the system thereafter, the method comprising:
   authenticating a user to the system directly or via a proximity device;
   authenticating the proximity device to a receiver in the system;
   upon successful authentication, initiating operation of the system;
   intermittently communicating between the proximity device and the receiver to verify whether the proximity device is within continued proximity of the system; and
   if the proximity device has not authenticated the user after a predetermined number of attempts, garbling authentication algorithms stored in the proximity device.

2. The method of claim 1, wherein the authentication algorithms include an algorithm to authenticate the user to the proximity device and another algorithm to authenticate the proximity device to the receiver in the system.

3. The method of claim 1, further comprising:
   communicating a distress signal, if it is determined that the proximity device is not operating in proximity of the system.

4. The method of claim 1, further comprising:
   beginning operation of the system in a fail-safe mode if it is determined that the proximity device is not operating in proximity of the system.

5. The method of claim 1, wherein the proximity device is one of the following: a personal digital assistant (PDA), a cellular phone, a pager, a smart card, a pocket PC, an audio-video device, a laptop, a tablet PC, a camera, or a portable device carried by a courier.

6. The method of claim 1, wherein authenticating the user or to the proximity device comprises at least one or a combination of the following: receiving user identification (ID) information, scanning the user's finger print, recognizing the user's facial characteristics, recognizing the user's voice, verifying a user's DNA, and verifying biometrics of the user.

7. The method of claim 1, wherein authenticating the proximity device to the receiver comprises at least one or a combination of the following: a challenge-response algorithm, a digital signature algorithm, a public-private key algorithm, a one-time password algorithm, and a symmetric key algorithm.

8. The method of claim 1, wherein authenticating the proximity device to the receiver comprises one of: communicating via a wireless interface or via a wired interface.

9. A system for user authentication to a machine and secure operation of the machine thereafter, the system comprising:
   a receiver coupled to, or integrated with, the machine; and
   a proximity device, comprising;
     means for authenticating a user to the proximity device;
     means for authenticating the proximity device to the receiver;
     means for, upon successful authentication, intermittently communicating between the proximity device and the receiver to verify whether the proximity device is within proximity of the machine; and
     if the user cannot be authenticated after a predetermined number of attempts, means for garbling authentication algorithms stored in the proximity device.

10. The system of claim 9, wherein the receiver comprises:
    means for determining whether the proximity device is in proximity of the machine; and
    means for beginning operation of the machine in a fail-safe mode if it is determined the proximity device is no longer operating within proximity.

11. The system of claim 10, wherein the receiver further comprises:
    means for initiating communication of a distress signal to a receiving station upon beginning operation in a fail-safe mode.

12. The system of claim 9, wherein the proximity device is one of the following: a personal digital assistant (PDA), a cellular phone, a pager, a smart card, a pocket PC, an audio-video device, a laptop, a tablet PC, a camera, or a portable device carried by a courier.

13. The system of claim 9, wherein the means for authenticating a user to the proximity device comprises at least one or a combination of the following: means for receiving user identification (ID) information, means for scanning the user's finger print, means for recognizing the user's facial characteristics, means for recognizing the user's voice, means for verifying a user's DNA, means for recognizing body temperature, means for recognizing blood pressure, and means for verifying biometrics of the user.

14. The system of claim 9, wherein the means for authenticating the proximity device to the receiver comprises at least one of the following: means for processing a challenge-response algorithm, means for processing a digital signature algorithm, means for processing a public-private key algorithm, means for processing a one-time password algorithm, means for processing the identity of the user, and means for processing a symmetric key algorithm.

15. The system of claim 9, wherein the proximity device further comprises:
    means for storing identification information about at least a first user.

16. A device for providing authentication of a user to a system and for providing secure operation of the system thereafter, the device comprising:
    memory for storing identification information of at least a first user;
    an interface for authenticating a user;
    an interface for authenticating the device to a receiver integrated with the system;
    logic configured to intermittently communicate with the receiver upon successful authentication; and
    logic configured to garble authentication protocols upon a predetermined number of failed attempts at authenticating the user.

17. The device of claim 16, wherein the interface for authenticating the device to the receiver is a wireless interface.

18. The device of claim 16, wherein the interface for authenticating the device to the receiver is a wired interface.

19. The device of claim 16, wherein the authentication protocols include a protocol to authenticate the user to the proximity device and another protocol to authenticate the proximity device to the receiver in the system.

20. The device of claim 16, further comprising:
logic configured to operate the device in a sleep mode, such that minimal power needed to maintain intermittent communications with the receiver is utilized.

21. A method for providing secure authentication to operate a vehicle, the method comprising:
authenticating a user to a proximity device;
authenticating the proximity device to a receiver of a vehicle, the receiver integrated within the vehicle;
garbling sensitive information stored in the proximity device if the proximity device has not authenticated the user after a predetermined number of attempts;
upon successful authentication, initiating operation of the vehicle; and
intermittently communicating between the proximity device and the receiver to verify whether the proximity device is within continued proximity of the vehicle.

22. A method of claim 21, wherein the vehicle comprises one of the following: an automobile, an airplane, a train, heavy machinery, and watercraft.

23. A method of claim 22, wherein the sensitive information includes algorithms which are used to authenticate a user to proximity device and to authenticate the proximity device to the receiver of the vehicle.

* * * * *